(12) United States Patent
Di Mambro et al.

(10) Patent No.: US 7,536,304 B2
(45) Date of Patent: May 19, 2009

(54) METHOD AND SYSTEM FOR BIO-METRIC VOICE PRINT AUTHENTICATION

(75) Inventors: Germano Di Mambro, Lincoln, MA (US); Bernardas Salna, Vilnius (LT)

(73) Assignee: Porticus, Inc., Lincoln, MA (US)

( * ) Notice: Subject to any disclaimer, the term of this patent is extended or adjusted under 35 U.S.C. 154(b) by 0 days.

(21) Appl. No.: 11/420,190

(22) Filed: May 24, 2006

(65) Prior Publication Data

US 2007/0185718 A1 Aug. 9, 2007

(51) Int. Cl.
*G10L 21/00* (2006.01)
(52) U.S. Cl. .............. 704/273; 704/270.1; 704/270
(58) Field of Classification Search ............... 704/231, 704/235, 236, 243, 246, 273, 270, 270.1, 704/275, 250, 255, 205, 207, 209; 455/411, 455/410; 707/9
See application file for complete search history.

(56) References Cited

U.S. PATENT DOCUMENTS

| | | | |
|---|---|---|---|
| 5,794,205 A * | 8/1998 | Walters et al. ............. 704/275 |
| 6,016,476 A | 1/2000 | Maes et al. | |
| 6,084,967 A | 7/2000 | Kennedy et al. | |
| 6,213,391 B1 | 4/2001 | Lewis | |
| 6,266,640 B1 | 7/2001 | Fromm | |
| 6,510,415 B1 | 1/2003 | Talmor et al. | |
| 6,601,762 B2 | 8/2003 | Piotrowski | |
| 6,934,849 B2 | 8/2005 | Kramer et al. | |
| 6,950,810 B2 | 9/2005 | Lapsley et al. | |
| 7,092,943 B2 * | 8/2006 | Roese et al. ................ 707/9 |
| 7,158,776 B1 * | 1/2007 | Estes et al. ............... 455/411 |

* cited by examiner

*Primary Examiner*—Huyen X. Vo
(74) *Attorney, Agent, or Firm*—Akerman Senterfitt; Pablo Meles

(57) ABSTRACT

A method (700) and system (900) for authenticating a user is provided. The method can include receiving one or more spoken utterances from a user (702), recognizing a phrase corresponding to one or more spoken utterances (704), identifying a biometric voice print of the user from one or more spoken utterances of the phrase (706), determining a device identifier associated with the device (708), and authenticating the user based on the phrase, the biometric voice print, and the device identifier (710). A location of the handset or the user can be employed as criteria for granting access to one or more resources (712).

26 Claims, 8 Drawing Sheets

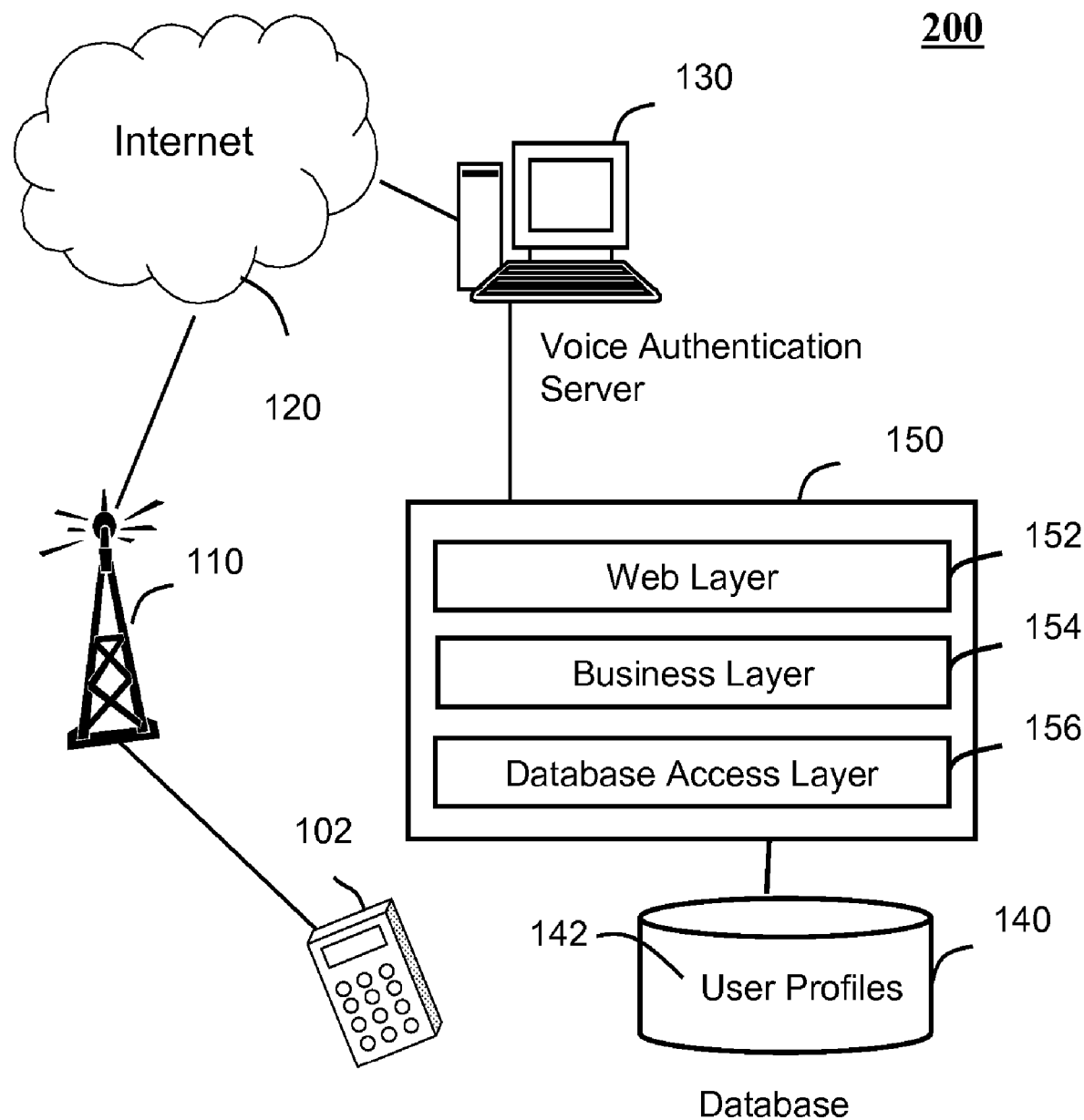
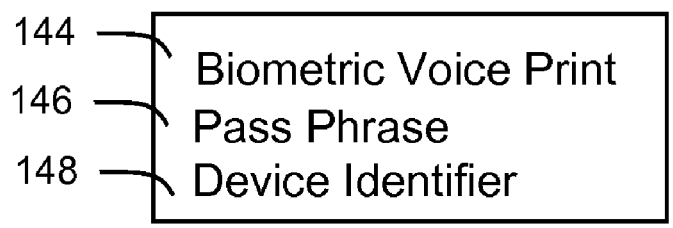
FIG. 2

500

- 501 — User starts application.
- 502 — User is prompted to record their voice (a particular phrase) for voice print creation.
- 503 — User records their voice using the UI provided.
- 504 — User types in a PIN number.
- 505 — The User is prompted to register their profile.
- 506 — The registration details along with the recorded voice are sent to the Authentication server.
- 507 — The Authentication server creates the user's voiceprint.
- 508 — The Authentication server creates the user's profile using their voice print, and his PIN.
- 509 — The Authentication server responds back with a positive confirmation to the User.

- 602 — User starts application
- 604 — User is prompted to record his voice (the same phrase that was recorded earlier) for voice print verification.
- 606 — User records his voice using the UI provided.
- 608 — User types in the PIN he had used to register with the authentication server.
- 610 — The authentication details along with the recorded voice are sent to the Authentication server.
- 612 — The Authentication server retrieves the user's voiceprint using the user's PIN.
- 614 — The Authentication server uses the Verification module to verify the user's recorded voice against his stored voiceprint.
- 616 — The Authentication server responds back to the User.
- 618 — If the authentication is successful the user can proceed further with the application
- 620 — If the authentication is unsuccessful the user is prompted about authentication failure and application exits

FIG. 6

METHOD AND SYSTEM FOR BIO-METRIC VOICE PRINT AUTHENTICATION

CROSS-REFERENCE TO RELATED APPLICATION

This application claims provisional priority on U.S. Patent Application Ser. No. 60/685,427, filed on May 27, 2005.

FIELD OF THE INVENTION

The present invention relates, in general, to speech recognition and, more particularly, to voice identification.

BACKGROUND

Advances in electronic technologies and software have enabled systems to more effectively recognize and identify people. For example, image processing systems such as cameras can capture an image of a person and identify a person from the image. Fingerprint scanning systems can capture a fingerprint for identifying a person through touch. Voice processing systems can identify a person through their voice. These technologies provide for identification of a user prior to use for ensuring system security and delegating access to the system.

Voice Identification (ID) systems have been used in a variety of security-related applications. Voice ID, sometimes called voice authentication, is a type of user authentication that uses voiceprints and pattern recognition software to verify a speaker. An adaptation of biometrics, Voice ID relies on the premise that vocal characteristics, like fingerprints and the patterns of people's irises, are unique for each individual.

More people can interact together on-line over the Internet through the a coupling of mobile devices and computers. Mobile devices are capable of going on-line and establishing connections with other communication systems. Identifying a user of the mobile device is an important aspect for providing secure access However, the identify of a user of the mobile device is not generally available. A need therefore exists for authenticating a user.

SUMMARY

Embodiments of the invention concern a method for voice authentication on a device. The method can include receiving one or more spoken utterances from a user, recognizing a phrase corresponding to the one or more spoken utterances, identifying a biometric voice print from the one or more spoken utterances of the phrase, determining a device identifier associated with the device, and authenticating the user based on the phrase, the biometric voice print, and the device identifier. A variability of the one or more spoken utterances can be determined for creating the biometric voice print. The biometric voice print is a vocal tract configuration that is physically unique to a vocal tract of the user. Upon authenticating the user, access can be granted to one or more resources having a communication with the device. A location of the device or the user can be determined for granting access.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

FIG. 2 is an exemplary illustration of a voice authentication system deployed within the mobile communication environment of FIG. 1 in accordance with an embodiment of the inventive arrangements;

FIG. 5 is a flowchart for creating a user profile suitable for use in a voice authentication system in accordance with an embodiment of the inventive arrangements;

FIG. 5 is a flowchart for verifying a user suitable for use in a voice authentication system in accordance with an embodiment of the inventive arrangements;

FIG. 6 is a flowchart for creating a user profile suitable for use in a voice authentication system in accordance with an embodiment of the inventive arrangements;

DETAILED DESCRIPTION

Figure 1:
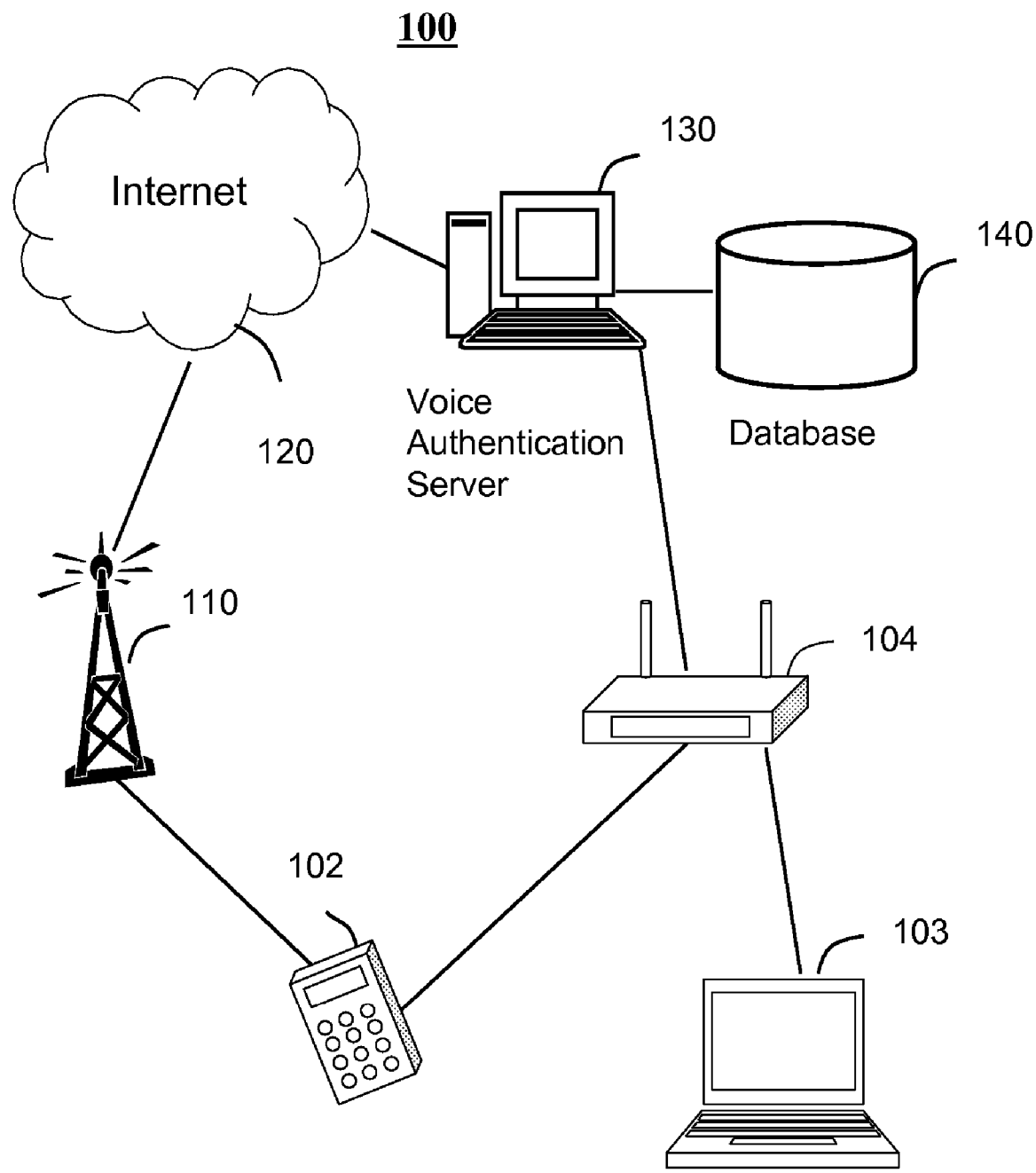
FIG. 1 is a mobile communications environment in accordance with an embodiment of the inventive arrangements.

Detailed embodiments of the present method and system are disclosed herein. However, it is to be understood that the disclosed embodiments are merely exemplary, and that the invention can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely. The term "processing" can be defined as number of suitable processors, controllers, units, or the like that carry out a pre-programmed or programmed set of instructions.

The terms "program," "software application," and the like as used herein, are defined as a sequence of instructions designed for execution on a computer system. A program, computer program, or software application may include a subroutine, a function, a procedure, an object method, an object implementation, an executable application, a source code, an object code, a shared library/dynamic load library and/or other sequence of instructions designed for execution on a computer system.

Embodiments of the invention concern a system and method for authenticating a user. The method can include receiving one or more spoken utterances from a user, recognizing a phrase corresponding to one or more spoken utterances, identifying a biometric voice print of the user from a variability of one or more spoken utterances of the phrase, determining a device identifier associated with the device, and authenticating the user based on the phrase, the biometric voice print, and the device identifier.

Embodiments of the invention also include an authentication system that can be based on a user's unique voice print, a phrase the user speaks during a creation of the voice print, and a user's handset's identifier, for example an IMEI number. In one implementation a location of the handset or the user can be employed as an additional criteria for approving access to one or more resources. The system can replace, for example, the current "social security number/mother's maiden name" model of user identification with a more robust method using a biometric characteristic, namely, the user's voice.

Referring to FIG. 1, a mobile communication environment 100 for voice authentication is shown. The mobile communication environment 100 can include a voice authentication server 130, a database 130, and one or more mobile devices 102. User profiles can be stored on the database 130 which can be used to identify a user of the mobile device 102. A user profile can include a pass phrase, a biometric voice print, and a device identifier. The server 130 can compare a user's profile to other user profiles stored on the database 140 for authorizing the user's voice. For example, a user of the mobile device 102 can speak into the mobile device for accessing one or more resources available to the mobile device. Upon authorizing the user's voice, access can be granted to one or more resources. For example, a resource can be a server, a PBX, or any other suitable communication system. The resource can provide a feature or service available to the device such as a music downloading, on-line gambling, subscription, gaming, and the like. The resource can provide access to a secure or non-secure website such as a personal information, a remote server, or a data store hosting financial data or business data, but is not herein limited to these.

The server 130 can acknowledge whether a pass phrase spoken by the user is a correct pass phrase and whether the biometric voice print associated with a pronunciation of the phrase is a correct match to a user profile in the database. In particular, the biometric voice print is captured by analyzing one or more variabilities in the user's speaking style during one or more pronunciations of the pass phrase. For example, the voice authentication server 130 can determine whether characteristics of the user's voice captured during a pronunciation of the pass phrase match one or more biometric voice prints in the database 140 for authenticating access to one or more resources. The server 130 can also verify that the mobile device 102 is a device authorized for use to access resources and is a device associated with the biometric voice print of the user. In particular, the server 130 can validate that the user speaking into the mobile device 102 is associated with the mobile device. In one example, the server 130 can determine if the device is registered to the user through an IMEI number associated with the captured biometric voice print. The IMEI number is a device identifier that is unique to the mobile device. In another arrangement, the server 130 can determine a location of the device 102 for authorizing access to one or more resources. For example, the mobile device 102 can include a global positioning system (GPS) for identifying a location of the device. Alternatively, the server can authorize access to resources based on a location stated by the user. For example, the user can speak their location, and the server 130 can determine if the spoken location corresponds with an authorized or accepted location of the device or the user. The user's voice can be processed on the mobile device 102 or at the server 130 for validating an identity of the user.

The mobile communication environment 100 can provide wireless connectivity over a radio frequency (RF) communication network or link with one or more voice authentication servers 130 on the system. The server 130 can be a Gateway, PBX, or any other telecommunications network device capable of supporting voice and data delivery. Communication within the network 100 can be established using a wireless, copper wire, and/or fiber optic connection using any suitable protocol (e.g., TCP/IP, HTTP, HTTPS, SIP etc.). In one arrangement, the mobile device 102 can communicate with a base receiver 110 using a standard communication protocol such as CDMA, TDMA, OFDM, GSM, or the like. The base receiver 110, in turn, can connect the mobile device 102 to the Internet 120 over a packet switched link. The internet 120 can support application services and service layers for providing media or content to the mobile device 102. Application service layers can include database access for financial or business based applications. The mobile device 160 can also connect to other communication devices through the Internet 120 using a wireless communication channel. The mobile device 160 can establish connections with a server 130 on the network and with other mobile devices for exchanging voice, data, and media. The server can host application services directly, or over the internet 120 which can be accessed through the mobile device 102.

The mobile device 102 can send and receive data to the server 130 or other remote servers on the mobile communication environment 100. For example, the mobile device 160 can also connect to the Internet 120 over a WLAN. Wireless Local Access Networks (WLANs) provide wireless access to the mobile communication environment 100 within a local geographical area. WLANs are typically composed of a cluster of Access Points 104 also known as base stations. The mobile communication device 102 can communicate with other WLAN stations such as the laptop 103 within the base station area for exchanging voice, data, and media. In typical WLAN implementations, the physical layer uses a variety of technologies such as 802.11b or 802.11g WLAN technologies. The physical layer may use infrared, frequency hopping spread spectrum in the 2.4 GHz Band, or direct sequence spread spectrum in the 2.4 GHz Band.

The mobile device 102 can send and receive data to and from the server 130 over a circuit switch RF connection 110 or a packet based WLAN AP 104, but is not herein limited to these. Notably, the data can include the user's profile which can be shared amongst one or more voice authentication servers for granting the user access to one or more resources. Understandably, voice can be represented as packets of voice which can be transmitted to and from the mobile devices 160 to provide voice communication. For example, a user of the mobile device 160 can initiate a call to the server 130 or the laptop 103 for accessing one or more features available to the mobile device. Voice data can be transmitted over the mobile communications environment 100 thereby providing voice communication. The mobile device 160 can be a cell-phone, a personal digital assistant, a portable music player, or any other type of communication device.

Referring to FIG. 2, an exemplary illustration of a voice authentication system 200 deployed within the mobile communication environment 100 is shown. The voice authentication system 200 can include the voice authentication server 130, an interface 150, and the database 140. The server 130 can access the database 140 through the interface 150 for retrieving user profiles. The interface can include a web layer 152, a business layer 154, and a database access layer 156. It should be noted that the interface 150 is merely illustrative of the transport layers involved with data processing on a network. The interface 150 may have more or less than the number of components shown and is not limited to those shown.

The database 140 can include a plurality of user profiles 142 for voice authentication. A user profile 142 can be unique to the user and unique to the device. The user profile 142 can include a biometric voice print 144, a pass phrase 146, and a mobile device identifier 148. The pass phrase 146 can be one or more words specifically selected by the user to be recited during voice authentication. When the user speaks the pass phrase into the mobile device 102, a voice print of the user's voice can be captured and stored in the user profile 142. The biometric voice print 142 identifies characteristics of the user's speaking style that are unique to the user. In particular, the biometric voice print 142 represents a vocal tract configuration difference that is physically unique to a vocal tract of the user. That is, the user's vocal tract is capable of undergoing physical changes which are dependent on the physical formations of the user's vocal tract. The biometric voice print captures the physical features associated with these characteristic changes of the vocal tract during the pronunciation of the pass phrase that are unique to the individual. A user's vocal tract configuration includes the esophagus, the pharynx, the larynx, the mouth, the tongue, and the lips. These physical attributes can undergo a certain physical change during speech production during the articulation of a pass phrase, which is characteristic of the user's vocalization and speaking style. In particular, the amount of change these physical attributes undergo during one or more pronunciations of a spoken utterance can be measured for validating a user's identity.

Figure 3:
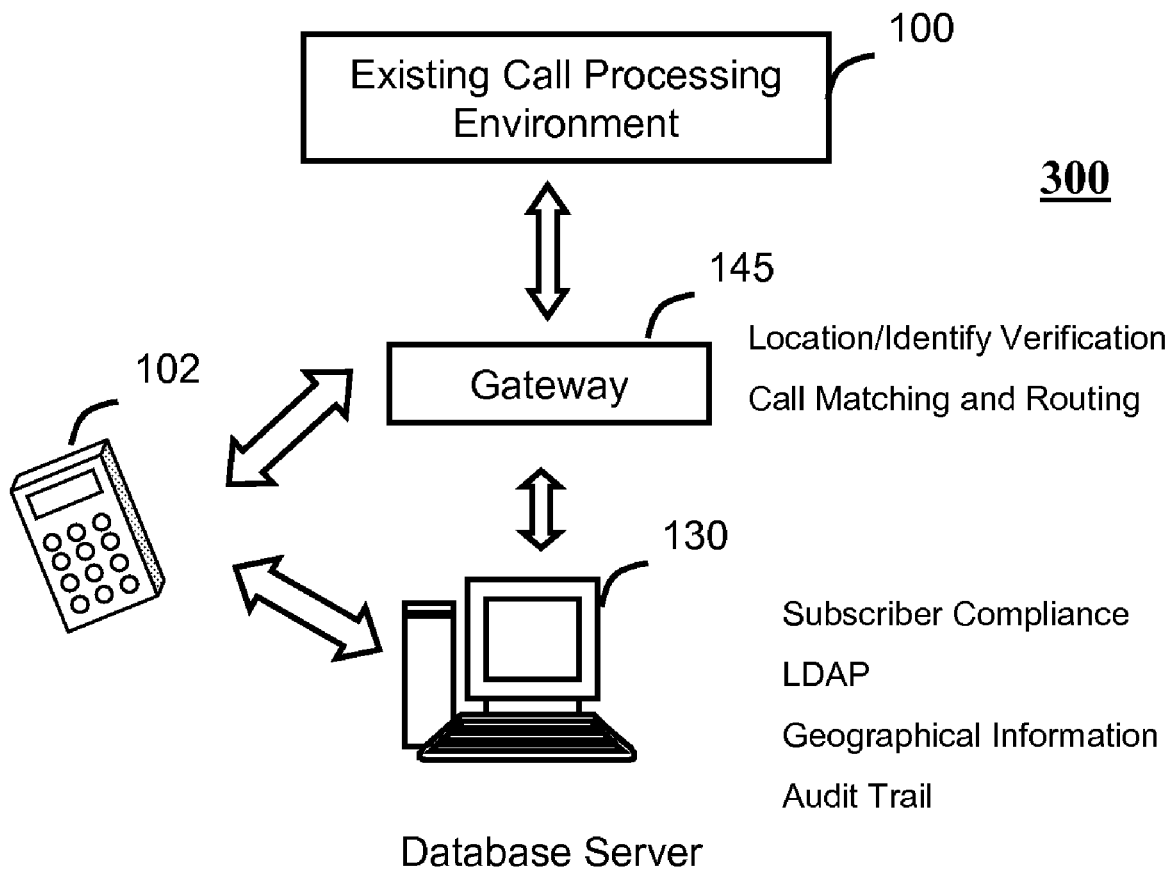
FIG. 3 is an exemplary implementation of the voice authentication system of FIG. 2 in accordance with an embodiment of the inventive arrangements.

Referring to FIG. 3, an exemplary implementation 300 of the voice authentication system 200 is shown. The exemplary implementation 300, includes a handset 102, such as a mobile telephone or other mobile computing device, and a voice authentication server 130 in communication with the handset over the mobile communication environment 100. The server 130 can be any suitable computing or networking server. The software running on the server 130 can include the web layer 152 (See FIG. 2), for communication with the handset, a business layer (154), and a database access layer (154) for storing and retrieving data, though are not limited to these. The server 130 can also include a monitoring page, which allows administrative access to the server. For example, a user can update their profile through the monitoring page. The voice authentication server 130 provides for user profile creation, user profile maintenance, and user authentication. For example, a user profile can be generated from the biometric voice print, the pass phrase, and the device identifier and stored in the voice print database 140 as described in FIG. 2. User profile maintenance entitles a user to update or change their profile details such as their biometric voiceprint, and password, and associated information. User authentication allows users to be authenticated against their previously created voiceprints. The authentication can be performed using the user's recorded voice, and the handsets IMEI or the PIN provided to the user. For example, in place of the IMEI, a PIN can be assigned to the mobile device for associating the device with the user's profile.

In addition to the system components previously shown in FIG. 2, the exemplary implementation 300 can include a gateway 145 inserted between the voice authentication server 130 and the existing call processing mobile communication environment 100 of FIG. 1. In one arrangement, the server 130 can support subscriber compliance, LDAP, and audit trails. In one arrangement, the gateway can 145 can verify a location of the caller using information through GPS positional data provided by the mobile device 120. The combination of the biometric voiceprint recognition with a location verification capability makes a particularly convenient solution for such applications as gambling (which may, for example, only be allowed in some states or territories), or commerce (where sale of certain items may not be allowed to some jurisdictions). The gateway 145 can identify a location of the device from the GPS data to establish a location of the caller.

The gateway 145 can also perform call matching and routing in the mobile communication environment 100. For example, as is known in the art, the gateway can support ANI and DNIS for identifying a calling number and a called number associated with the user. A user can be identified by the number from which the user is calling, or by the number which the user is calling. In one arrangement contemplated, the calling information can be included as part of the user profile and used to verify an identify of a user. In practice, the voice authentication server 130 can authenticate a user speaking into the mobile device 160 with reference to user profiles stored on the database 130 by inquiring the gateway 145 for caller identification information and location information.

Figure 4:
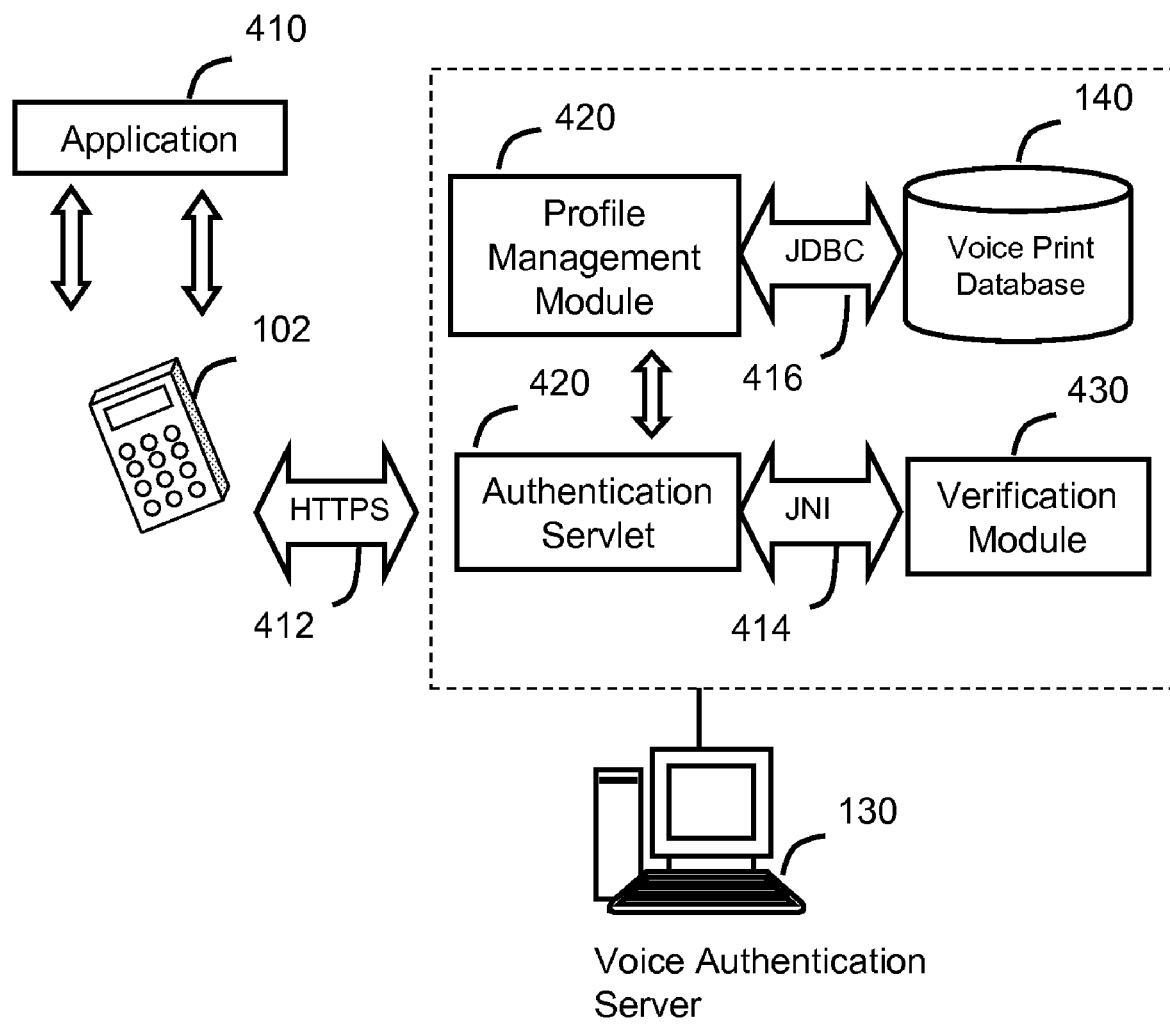
FIG. 4 is a voice authentication system in accordance with an embodiment of the inventive arrangements.

Referring to FIG. 4, an exemplary voice authentication system 200 is shown. The voice authentication system 200 can include the mobile device 102 having a connection to the voice authentication server 130. The authentication server 130 can include an authentication servlet 420, a profile management module 420, a verification module 420, and a voice print database 140. The modules may reside on the server 130 or at remote locations on other servers within the mobile communication environment 100. FIG. 4 refers to a client-server based architecture through aspects of the invention are not limited to this configuration. The principles of voice authentication can be equally applied in distributed networks and peer to peer networks.

It should be noted that some of the components are carried forward from FIG. 1 and that the components are provided merely to illustrate one embodiment for integrating the voice authentication system 200 within the mobile communications environment 100 (See FIG. 1). In practice, the voice authentication system 200 can grant a user of a mobile device access to one or more resources available to the device based on an authentication of the user's voice for accessing the resources or services. The voice authentication system 200 is not limited to the program modules shown or the architecture of the program modules. The program modules are merely presented as one embodiment for deploying the inventive aspects of voice authentication described herein.

The voice authentication system 200 can include an application 410 running on the mobile device (102). The application can be a software program written in a programming language such as C, C++, Java, Voice XML, Visual Basic, and the like. For example, the application 410 can be a financial or business application for sending confidential or secure information to and from a secure website. The confidential information can be in the form of voice, audio, video, or data. The application 410 can acquire access to underlying communication protocols supported by the mobile device. For example, the application 410 can be a Java 2 Micro Edition (J2ME) applet having socket connections supporting HTTP to one or more servers communicatively connected to the mobile device 410. The communication protocols can be supported through a native C interface. For example, the J2ME can access native C code on the mobile device 410 for connecting to a server (130).

The application 410 can communicate with an authentication servlet 420 running on the voice authentication server 130 (See FIG. 1). The Authentication Servlet can act as a front end to the mobile device client 102 and direct requests to the voice authentication server 130 depending on request type. For example, the request type may be of a user profile creation, a user profile update, or a user profile authentication as previously described. Based on the request type, the authentication servlet 420 can invoke an appropriate profile management function. That is, upon determining the request type, the profile management module 420 can communicate with the application 410 to perform the associated request.

In one arrangement, the authentication servlet 420 and the application 420 can communicate over a secure HTTP connection 412. The authentication servlet 420 can be communicatively coupled to a verification module 430 for authorizing a user. In one arrangement, the authentication servlet 420 can communicate with the verification module 430 over a Java Native Interface (JNI) 414. The JNI 414 provides programming language translation between the program components. For example, the authentication servlet 420 can be written in Java, whereas the verification module 430 may be written in C. The JNI 414 provides an interface to transport data from one format to another while preserving structural aspects of the code and data. The verification module 430 can communicate information to and from the application 410. Notably, the mobile device 102, HTTPS 412, authentication servlet 420, and JNI 414 establish a channel of communication between the verification module 420 on the voice authentication server (130) and the application (410) on the mobile device 102.

In practice, the mobile device 102 can send a user profile 142 (See FIG. 2) to the verification module 420. For example, when a user desires access to one or more resources or services offered to the mobile device, the mobile device 102 can present the application 410. The mobile device can also present the application when the user creates a user profile. For example, the application 410 can be a J2ME application which asks the user to speak a password phrase. The application 410 can also access a device identifier on the mobile device 102 such as an IMEI number. The information can be used to create the user profile. In certain device, an IMEI number extraction mechanism may not be supported through J2ME. Accordingly, such devices may include a provision for user to key in a short PIN which the user can easily remember and use for authentication. If an IMEI number is not supported, the user may be required to key in the PIN, which is then used to approve sending a stored IMEI number.

In one arrangement, the mobile device 102 can include a speech recognition engine for validating a the pass phrase. Understandably, the voice recognition engine may only evaluate that a phrase was recognized, and not an identity of the user. Accordingly, a first aspect of the voice authentication can be performed on the mobile handset; that is, the verifying the pass phrase. The biometric voice print authentication and device identifier can be evaluated at the server. Thus, a second aspect of voice authentication can be performed at the server.

Alternatively, the entire voice authentication, including the speech recognition, can be conducted on the server 130. In this case, the application 410 can create a user profile 142 (See FIG. 2) which includes the pass phrase (144), the biometric voice print (146), and the IDEI (148). Upon speaking the password phrase, the J2ME application 410 can send the user profile to the verification server. In one arrangement, the J2ME application 410 can perform voice processing on the spoken utterance (i.e. pass phrase) and encode one or more features of the biometric voice prior to create the user profile and sending it to the verification module 430. The encoding can compress the voice data to reduce the size of the voice packets required for transmitting the spoken utterance. For example, the voice data can be compressed using a vocoder as is known in the art. In a second arrangement, the spoken utterance can be transmitted in an uncompressed format to the verification module 430. For example, the audio can be transmitted in pulse code modulation (PCM) format or Microsoft Wave Format (WAV).

The profile management module 420 can communicate with the authentication servlet 420 for evaluating one or more user profiles stored in the voice print database 140. The profile management module 420 can create, update and delete user profiles. The profile management module 420 can also synchronize with other profile management systems. For example, the profile management module 420 can expose an API for integration with external systems after successful authentication of a user. In one arrangement, the Application Programming Interface (API) allows application developers to quickly integrate their applications in accordance with the aspects of voice authentication system herein discussed. For example, referring back to FIG. 2, the API can include a module for creating the biometric voice print (144), a module for creating the pass phrase (142), and a module for identifying the device (146). The API provides an interface to the authentication servlet 420 for accessing voice-print creation and authentication services.

The profile management module 420 can communicate with the voice print database 140 over a Java Database Connectivity (JDBC) 416 interface. The JDBC 416 can provide data access for retrieving and storing data from the voice print database 140. For example, the voice print database 140 can be a relational database composed of tables which can be indexed be row column formatting as is known in the art. The JDBC 140 provides a structured query language locating data headers and fields within the voice print database 140. The profile management module 420 can parse the user profile for the biometric voice print and compare the biometric voice print with other voice prints in the voice print database 140. In one arrangement, biometric voiceprints can be stored using the mobile handsets' IMEI number for indexing. Notably, the voice print database 140 includes one or more reference voice prints from multiple user's having a registered voice print. Upon determining a match with a voice print, the profile management module 420 can grant access to the user to one or more resource. For example, the profile management module 420 can allow a socket connection to one or more secure websites, business databases, financial centers, and the like.

Referring to FIG. 5 a flowchart for user profile creation is shown. The user profile creation may contain more or fewer than the number of steps shown. Reference will be made to FIG. 4 for describing the steps. At step 501, the user starts the application. For example referring to FIG. 4, the user activates a J2ME application 410. Alternatively, the user may be accessing a website, voice mail, or requesting a service that requires authentication, such as a log-in screen. In this case the device may automatically launch the J2ME application 410 for authorizing the user. At step 502, the user is prompted to record his voice for voice print creation. The user can submit a particular phrase that the user will recite during voice authorization. At step 503, the user records their voice using the provided application (410). At step 504, the user can enter in a PIN number. Again, the PIN number may be required if the application cannot retrieve an IMEI number from the device. If the application 410 can access the IMEI, then the PIN number may not be required. At step 505, the user is prompted to register his profile. For example, the user can elect to store the newly created user profile on a voice print database for later retrieval. At step 506, the registration details along with the recorded voice are sent to the authentication server. At step 507, The Authentication server (130) creates the user's voiceprint. At step 508, the Authentication server (130) creates the user's profile using the user's voice print, and IMEI (or PIN). For example, the user profile can be stored on the voice print database (140). At 509, the Authentication server (130) responds back with a positive confirmation to the user.

Referring to FIG. 6, a flowchart for verifying a user through voice authentication 600 is shown. The authentication 600 may contain more or fewer than the number of steps shown. Reference will also be made to FIG. 4 for describing components associated with practicing the steps. At step 601, the user starts application. The application may also start automatically based on a user's action, such as accessing a feature or service that requires authentication. At step 602, the user is prompted to record his voice for voice print verification. This is the same phrase that was recorded during user profile creation 500. At step 603, the user records his voice using the provided application (410). At step 604, the user types in the PIN that was used to register with the authentication server during user profile creation 500. At step 605, authentication details along with the recorded voice are sent to the authentication server (130). At step 606, the authentication server retrieves the user's voiceprint using the user's PIN. At step 607, the authentication server (130) uses the Verification module to verify the user's recorded voice against one or more stored voiceprints. At step 608, the authentication server responds back to the user. At step 609, if the authentication is successful, the user can proceed further with the service or application. At step 610, If the authentication is unsuccessful the user is prompted about authentication failure and the application exits.

Figure 7:
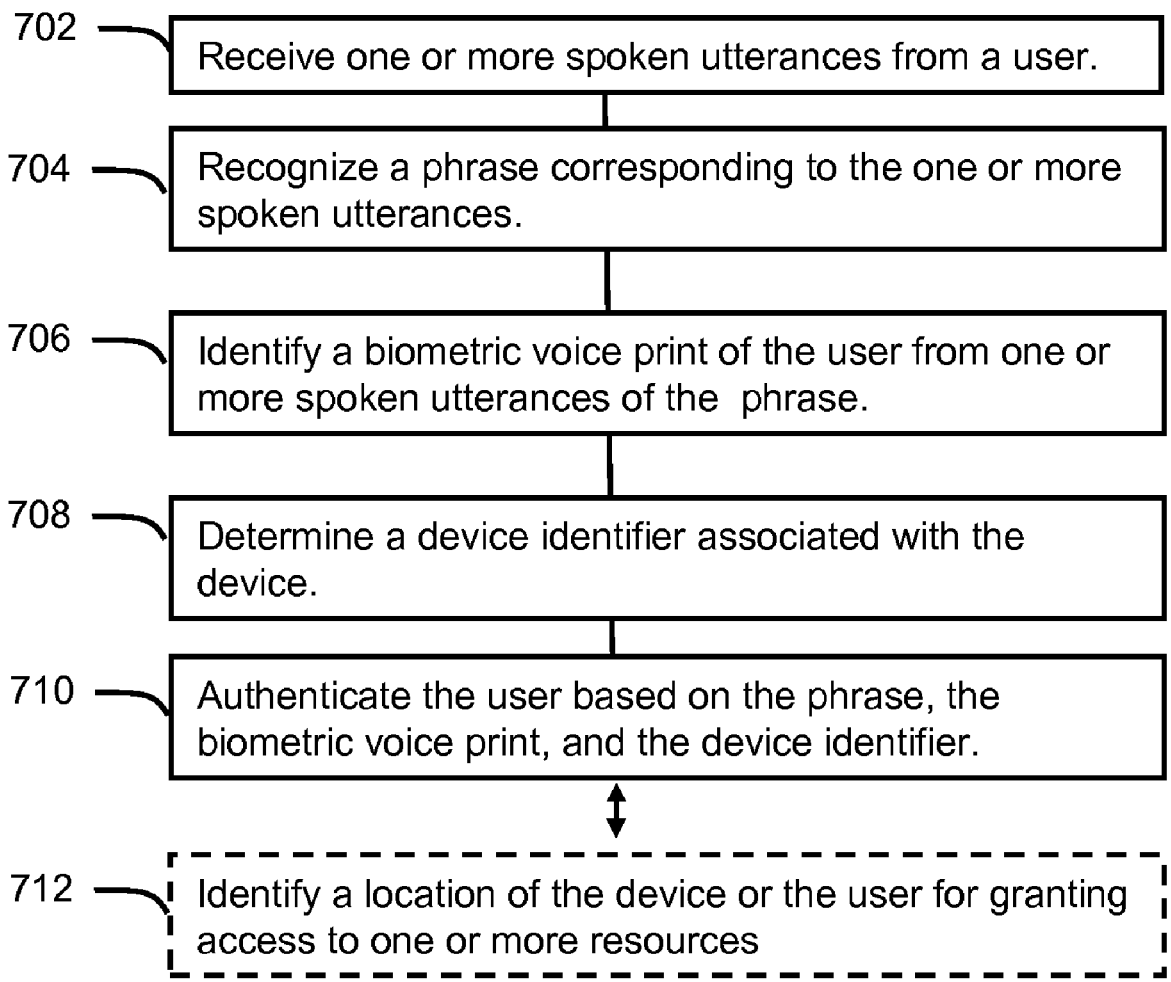
FIG. 7 is a method 700 for voice authentication on a device in accordance with an embodiment of the inventive arrangements.

Referring to FIG. 7, a method 700 for voice authentication on a device is shown. The method can include receiving one or more spoken utterances from a user (702), recognizing a phrase corresponding to the one or more spoken utterances (704), identifying a biometric voice print of the user from a variability of the one or more spoken utterances of the phrase (706), determining a device identifier associated with the device (708), and authenticating the user based on the phrase, the biometric voice print, and the device identifier (710). In particular, in one arrangement, the user speaks the spoken utterance (e.g. pass phrase) multiple times. The variation in the user's voice can be evaluated to determine changes in the user's vocal tract configuration. In one arrangement, a location of the device or the user can be determined (712) for granting access as previously described in FIG. 3.

The vocal tract configuration changes can be captured in the biometric voice print and compared with a plurality of reference voice prints on a voice print database for identifying a match. That is, a first voice print and at least a second voice print can be generated in response to a speaker's voice, a difference between the first voice print and a second voice print can be identified, and a determination can be made as to whether the difference corresponds to a natural change of the speaker's vocal tract. Notably, the biometric voice print is a vocal tract configuration that is physically unique to a vocal tract of the user. Consequently, the speaker can be authenticated if the difference is indicative of a natural change in the speaker's vocal tract.

For example, referring back to FIG. 3, the device 102 implementing the voice authentication method 700 can establish a connection to at least one authentication server, send a user profile to at least one authentication server, compare the user profile with a plurality of reference profiles stored on the at least one authentication server, and determine if the user profile matches one of the plurality of reference profiles for authenticating the user. Upon recognizing the phrase, the voice authentication server, or the device, can evaluate one or more vocal tract configuration differences between the spoken utterances. One or more vocal tract shapes from the plurality of reference profiles can be matched based on the vocal tract configuration difference.

Figure 8:
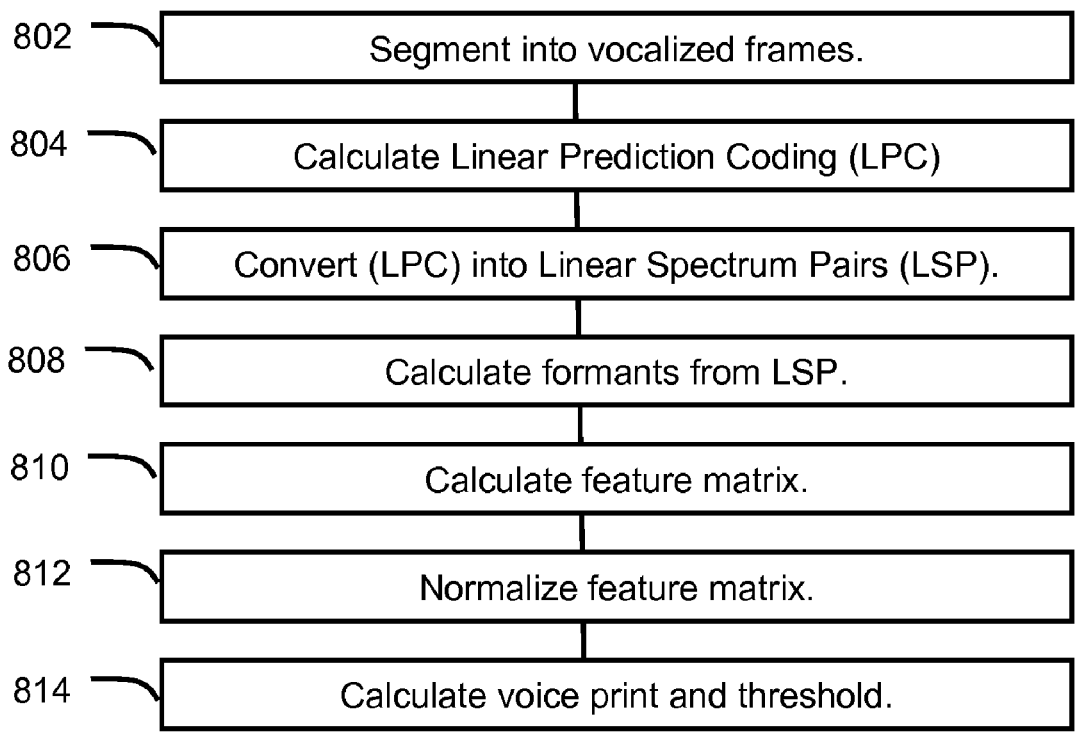
FIG. 8 is a voice authentication algorithm in accordance with an embodiment of the inventive arrangements.

In the foregoing, a detailed description of the voice authentication system for practicing the methods steps 700 is provided. In particular, referring to FIG. 8, an algorithm 800 for the voice authentication aspect of the voice authentication system is presented. The algorithm 800 is a high level description of the underlying voice processing methods employed for validating an identify of a user based on biometric voice print analysis. As such, it should be noted that the algorithm 800 can contain more than or fewer than the number of steps shown. In fact, each step can contain further contain steps not shown in the drawings but herein set forth in the specification. Reference will be made to FIGS. 4 when describing method 800.

At step 802, a speech utterance can be segmented into vocalized frames. For example referring to FIG. 4, the pass phrase (e.g. spoken utterance) the user speaks into the mobile device 102 can be partitioned into voiced and unvoiced segments. That is, regions corresponding to periodic regions such as vowels can be classified as voiced, and regions corresponding to non-periodic regions such as consonants can be classified as unvoiced. At step 804, Linear Prediction Coding (LPC) coefficients can be calculated from the voiced regions and at step 806 transformed into Linear Spectrum Pairs (LSP). LSP coefficients are suitable for compression and coding. At step 808, formants can be calculated from the LSP coefficients. Formants are those portions of the speech spectrum that correspond to resonances and nulls "formed" by the vocalization process. In particular, the physical structures of the human speech production system such as the throat, tongue, mouth, and lips form cavities which create resonances in the pressure wave emanating from the lungs. The formants in the spectral domain represent characteristics of the users vocal tract formation during pronunciation of the voiced frames. At step 810, information regarding the formant structure and features extracted during the LPC/LSP analysis can be included in a feature matrix. At step 812 the feature matrix can be normalized. One aspect of normalization can include removing background noise. A second aspect of normalization can include accounting for vocal tract configuration length and area. At step 814, a voice print and threshold can be calculated from the feature matrix. The biometric voiceprint can include the features shown in Table 1.

TABLE 1

1. A reference matrix. One of the feature marixes used for voiceprint calculation
2. An adaptive distance threshold (logarithmic distance, LD).
3. A variation bounds for each of the feature vectors in the feature matrix. A variation bounds includes a maximum and minimum value for each value of the feature vector.
4. Two mean average vectors that are calculated from three feature matrixes.
5. A mean vector calculated by adding and averaging matrix rows.

TABLE 1-continued

6. A mean feature variation vector.
7. A mean feature difference vector.

In practice, a user can present a spoken utterance corresponding to a pass phrase that was used during voice enrollment; that is, when the user registered their biometric voice print with a voice authorization server. For example, during enrollment, a user pronounces the same pass phrase three times. A feature matrix is calculated for each recording of the pass phrase. The feature matrix is a matrix of numeric values that represent features of the speaker's voice. In this case, three feature matrices are used to create the biometric voice print. For example, with reference to the enumerated voice print listed above in Table 1, various features including averages and bounds are used in the voice print. The features of Table 1 are used in conjunction with the three matrices to define the voice print. For example, the feature matrices define the features of the voice, and the attributes of Table 1 describe the variation of a vocal tract configuration. For instance, the attributes of Table 1 represent a vocal tract shape. Notably, the variation in the pronunciation of the pass phrase is captured by identifying bounds of the feature vector for each voice frame which are defined in the biometric voice print of Table 1. For example, index 3 of the biometric voiceprint in Table 1 identifies a maximum and minimum value for each element of the one or more feature vectors. For instance, the bounds can identify the naturally occurring change in amplitude of a formant, the change in bandwidth of a formant, of the change in location of a formant during pronunciation of the pass phrase, which is particular to a user speaking the pass phrase.

During verification, the user speaks the same spoken utterance corresponding to the pass phrase, and a biometric voice print is generated. The biometric voice print is compared against previously stored voice prints for identifying a match. During the verification process, a feature matrix is also calculated from the spoken phrase using the voice authentication algorithm 800 as used in enrollment. This feature matrix is compared against one or more reference matrices store in a voiceprint database. A logarithmic distance can be calculated for each feature matrix of a biometric voice print. If the logarithmic distance is less than a predetermined threshold level, a match can be determined, and the speaker can be identified. One unique aspect of the verification process includes setting a comparison threshold level that depends on a threshold from a voiceprint. The threshold depends on intra-speaker variability and can be adapted based on the user's voice. Alternatively the threshold can be set independently of the threshold and which is not adapted based on the user's voice.

Figure 9:
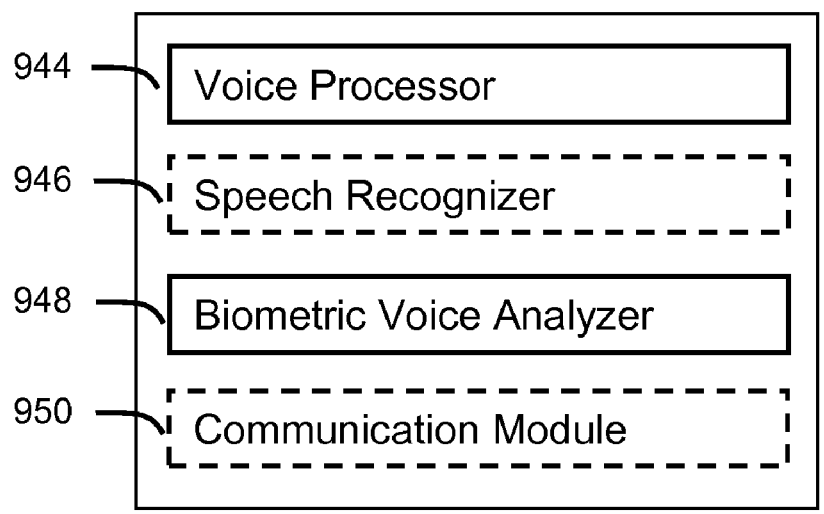
FIG. 9 is a voice authentication system in accordance with an embodiment of the inventive arrangements.

In one implementation, the method 800 of generating the voice print can be performed by a handset, and the method 700 of authorizing a user can be performed by a server in communication with the handset. Referring to FIG. 9, a diagram depicting various components of a voice authentication system 900 for practicing the method 800 of generating the voice print is shown. The voice authentication system 900 can include a voice processor 144 and a biometric voice analyzer 148. The voice processor 144 can receive a spoken utterance and at least one repetition of the spoken utterance from a user. The biometric voice analyzer 146 can calculate one or more vocal tract shapes from the spoken utterance and the at least one repetition, and calculate a vocal tract configuration difference between the one or more vocal tract shapes based on a varying pronunciation of the spoken utterance and the at least one repetition. A vocal tract configuration difference corresponds to a bounded physical change of a user's vocal tract associated with one or more spoken utterances. For example, a vocal tract configuration difference can be based on a momentum spectrum that accounts for a dynamic change of a speech spectrum over time. The momentum spectrum can include a lower bound and an upper bound for the one or more voice segments of speech, such that variations in the speech spectrum between the lower bound and the upper bound correspond to a unique vocal tract configuration.

In one arrangement, though not required, the voice processor 144 can include a speech recognizer 146. The speech recognizer 146 can validate a phrase spoken by the user during voice authentication. In one aspect, the speech recognizer 146 can also identify voiced and unvoiced regions in the spoken utterance, recognize one or more phonemes from the voiced regions, and identify a location of the one or more phonemes in the vocalized frames (e.g. voiced segments). The voice processor can segment a spoken utterance into one or more vocalized frames, generate one or more feature vectors from the one or more vocalized frames, calculate a feature matrix from the one or more feature vectors, and normalize the feature matrix over the one or more vocalized frames. For example, a feature matrix can be calculated for every spoken phrase. The speech utterance can be partitioned into one or more speech frames having time length between 5 and 20 ms.

The voice processor can identify an absolute minimum and maximum in the speech frames. The values can be compared against a predetermined threshold. If both maximum and minimum values are less than an amplitude level then the frame can be classified as having no voice component and the algorithm 800 proceeds to the next frame. If the minimum and maximum are greater than the amplitude level then an auto-correlation function is calculated for the speech frame signal. If one or more pre-specified autocorrelation terms are less than a predefined threshold then the frame is considered to lack a voiced signal and the algorithm 800 processed to the next frame.

A Fast Fourier Transform (FFT) can be applied to the voiced windowed speech frame. The speech frame can be multiplied by a weighting window to account for discontinuities prior to frequency analysis. The FFT converts each frame of N samples from the time domain into the frequency domain. The result obtained after this step is an amplitude spectrum or spectrum.

Human perception of the frequency contents of sounds of speech signals does not follow a linear scale. Accordingly, a Bark scale can be applied to the amplitude spectrum for converting from a linear frequency scale to a scale that approximates human hearing sensitivity. That is, a perceptual filter bank analysis can be performed on the one or more vocalized frames. One approach to simulate the Bark frequency is to use filter bank, one filter for each desired Mel-frequency component. The filter bank can have a triangular band pass frequency response. The spacing as well as the bandwidth is determined by one bark-frequency interval. The number of Bark spectrum coefficients IBR depends on frequency range. In telephone channel frequency range 3400 Hz matches 17 Bark. Therefore 0-3400 Hz frequency range matches 17 one bark bandwidth filters. Each filter band can have a triangular band pass frequency response, and the spacing as well as the bandwidth can be determined by a constant bark frequency interval. The spectrum frequency shifted in accordance with the Bark scale can be called a Bark spectrum.

The Bark spectrum $X_F(n,k)$ can be multiplied by weighting factors on a bark-scale frequency bank and the products for all weighting factors can be summed to get an energy of each frequency band. An energy matrix can be calculated for each speech frame of the spoken utterance. For example, the spoken pass phrase can be represented as a matrix E(m,i). In order to remove some undesired impulse noise, a three-point median filter can be used for smoothing. The smoothed energy $E_s(m,i)$ can be normalized by removing the frequency energy of background noise to get the primary energy associated with the speech signal $E_v(m,i)$. In one arrangement, the background noise energy $E_n(m,i)$. can be estimated by averaging the energy of the first 8 speech frames.

$$E_V(m, i) = E_S(m, i) - E_n(i)$$

$$E_n(i) = \frac{\sum_{m=1}^{8} E_S(m, i)}{8}$$

With the smoothed and normalized energy of the i-th band of the m-th frame $E_v(m,i)$, the total energy of the speech signal at the i-th band can be calculated:

$$E_B(i) = \sum_{m=1}^{M} |E_V(m, i)|$$

A threshold can be calculated:

$$T(i) = \ln \frac{E_B(i)}{E_n(i)}$$

If T(i)>1.5 the band can be left intact as more speech can be considered present than noise. Conversely, it the threshold is less, the band can be considered too noisy and not used in further calculations. Accordingly, higher speech content is reflected when more bands exceed the 1.5 threshold. The bands exceeding the threshold can be counted as the new band count. That is, the perceptual filter bank analysis includes estimating speech energy and noise energy in one or more frequency bands along a Bark frequency scale. Background noise can be suppressed during the perceptual filter bank analysis, by discarding filterbanks having a ratio of speech energy to noise energy that do not exceed a threshold of vocalization. The total signal energy can be calculated with the new band count:

$$E_a(m) = \sum_{i=1}^{IJQ} |E_V(m, i)|$$

A minimum and maximum value can be determined for each $E_a(m)$. An adaptive vocalized segmentation threshold can also be calculated based on the determined minimum and a root mean square term.:

$$Tv = E_a\text{Min} + 0.3 * RMS$$

RMS—standard deviation of $Ea(m)$

Frames having $E_a(m) > Tv$ can be classified as vocalized and a new matrix can be computed using only the vocalized frames. Notably, the aforementioned voice processing techniques are employed to identify voice segments of speech and calculate a feature matrix based on these voiced regions of speech. Voiced regions of speech can include phonemes which can be identified and located within the spoken utterance. For example, referring to FIG. 9, the speech recognizer 146, can identify phonemes.

Following voiced activity analysis, Linear Prediction Coefficients (LPC) can be calculated from the energy bands of the perceptual filter bank analysis. Pre-emphasis can be applied to the $E_v(m,i)$ to reduce the dynamic range of the spectrum. This improves the numerical properties of the LPC analysis algorithms. The maximum of the amplitude spectrum is found, and all points after the maximum can be multiplied by weighting coefficients. The LPC's can then be converted to Line Spectral Pair coefficients (LSP's). Formants and anti-formants can be calculated from the LSP's, and a feature vector can be calculated from the formants and anti-formants. Upon determining the formants and anti-formants, a feature vector for each speech frame can be calculated. A feature matrix can be created for the feature vectors representing voiced segments of the spoken utterance. The feature matrix can include formant locations, formant amplitudes, formant bandwidths, anti-formant locations, anti-formant amplitudes, anti-formant bandwidths, phase information, average amplitude information, difference information, and dynamic features. In particular, the formant and anti-formant information is represented along a Bark scale. Differences in the formant and anti-formant information can be evaluated for characterizing one aspect of a natural change in a vocal tract configuration. That is, a distortion can be evaluated for one or more feature vectors for identifying voice print matches generated from similar vocal tract configurations.

A vocal tract spectrum can be calculated from the feature matrix. In particular, formants having similar characteristics between the one or more repetitions of the spoken utterance are used for creating the vocal tract spectrum. That is, formants substantially contributing to a consistent representation of vocal structure are used for creating the vocal tract spectrum. The vocal tract spectrum can be calculated from the LPC's or from an autocorrelation function. Changes in the vocal tract shape, which correspond to a vocal tract configuration, can be identified from changes in the vocal tract spectrum. In particular, the vocal tract configuration can be represented as one or more sections having a corresponding length and area that are characteristic to one or more sections of the user's vocal tract. A vocal tract configuration difference corresponds to a bounded physical change of a user's vocal tract associated with one or more spoken utterances. For example, a vocal tract configuration difference can be based on a momentum spectrum that accounts for a dynamic change of a speech spectrum over time. The dynamic change can occur to an amplitude of the spectrum or a phase of the spectrum. The momentum spectrum can include a lower bound and an upper bound for the one or more voice segments of speech, such that variations in the speech spectrum between the lower bound and the upper bound correspond to a unique vocal tract configuration. The upper and lower bounds for the feature matrix were presented in Table 1.

For example, referring to FIG. 9, the voice processor 944 calculates a feature matrix from the feature vectors for multiple sections of the spoken utterance corresponding to the one or more vocalized frames, wherein the feature matrix is a concatenation of feature vectors of the one or more vocalized frames. The voice processor 944 also normalizes the feature matrix by removing vocalized frames shorter that a predetermined length and removing vocalized frames corresponding to vocal tract configurations that exceed an average vocal tract configuration. The vocal tract spectrum can be characterized or represented by a number of features in the feature matrix. The attributes of the features have been selected from statistical research of voice databases to minimize an intra-speaker variability and that maximize an inter-speaker variability.

Understandably, during voice authentication, the biometric voice analyzer (See FIG. 9) compares identification parameters of the feature vector against identification parameters of a stored feature vector of the speaker's voice. The parameters include the formant information and anti-formant information captured in the biometric voice print of Table 1. Notably, the biometric voice print includes the three feature matrices (associated with the three repetitions of the phrase) and the attributes of Table 1 that characterize the user's vocal tract shape. That is, the vocal tract shape is characterized by, and can be calculated from, the feature matrix.

During calculation of the feature matrix for determining a vocal tract shape, a first vocal tract shape will be generated from the first three formants specified in the feature matrix. The vocal tract shape curve can be calculated with 0.2 cm increments from the formant frequencies. A vocal tract length can also be calculated for the voiced frames. For example, the biometric voice analyzer calculates a first vocal tract shape from lower formants of the first biometric voice print, determines a vocal tract configuration difference based on the first vocal tract shape, identifies a similar vocal tract shape providing the smallest vocal tract configuration difference, and shapes the similar vocal tract shape from higher formants of the first biometric voice print. The higher formant frequencies are emphasized to characterize one aspect of a speaker's articulation style.

Referring again to FIG. 9, the biometric voice analyzer 944 determines one or more vocal tract cross-section areas from the feature vector, and determines one or more vocal tract lengths for the one or more vocal tract cross-section areas. Also, a communication bandwidth can be taken into account when determining vocal tract shape. For example, formant frequencies can be adjusted for telephone bandwidth which is generally between 140 Hz to 4.6 KHz: $F1=640$, $F2=1730$, $F3=2860$, and $F4=3340$. The cross-section of the vocal tract can be updated based on the compensated formant frequency locations. An average of the vocal tract cross-section can be determined for the vocal tract shape based on one or more vocalized frames of speech. For example, the cross-section can be determined for phoneme regions of voiced speech where change in the vocal tract shape are relatively constant.

Variation bounds can be created based on a variability of the vocal tract shape for producing variation vectors for the feature vectors in the feature matrix. For example, the biometric voice analyzer 944 calculates a logarithmic distance for the variation vectors, and establishes a threshold based on the logarithmic distance. The threshold is used to determine whether a vocal tract configuration difference for authenticating a user is within a variation bounds. The variation bounds can be represented as an average and a standard deviation of the feature vectors such as that shown in Table 1. The biometric voice analyzer 944 also calculates a histogram on the variation bounds, determines a maximum for the histogram, calculates a derivative vector based on the maximum, and calculates a personal histogram and second variation bounds based on the derivative vector.

During verification, biometric voice analyzer 944 evaluates a personal histogram to determine whether a biometric voice print matches one of the said plurality of biometric voice prints for verifying an identity of the user. An identify is validated when a first plurality of bins of the personal histogram are filled, and wherein the identity is invalidated when a second plurality of bins of the personal histogram are filled. Notably, the feature information of Table 1 in the biometric voice print is used to generate a personal histogram for determining when a user's vocal tract shape matches the personal histogram. The histogram statistically identifies whether the features of the biometric voice print are characteristic of the person speaking. That is, variations in the speakers vocal tract shape can evaluated and statistically compared to variations associated with a particular user's vocal tract configuration. Recall, multiple presentation of the spoken utterance are provided for determining a vocal tract configuration difference; that is, a change in vocal tract shape. The personal histogram provides a practical detection method for classifying and authorizing a user. For example, during verification, the biometric voice analyzer calculates a logarithmic distance, and evaluates a threshold for determining when the first plurality of bins of the personal histogram is filled. The threshold can also be adapted based on the user's voice.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one from another entity or action without necessarily requiring or implying any actual such relationship or order between such entities or actions.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for voice authentication on a device, comprising:

receiving one or more spoken utterances from a user at the device;

recognizing a phrase corresponding to said one or more spoken utterances;

identifying a biometric voice print from the one or more spoken utterances of said phrase;

verifying a location of said device;

determining a device identifier associated with said device;

authenticating said user based on the phrase, said biometric voice print, said location, and said device identifier;

establishing a connection to at least one authentication server;

sending a user profile to said at least one authentication server;

comparing said user profile with a plurality of reference profiles stored on said at least one authentication server;

upon recognizing the phrase, evaluating one or more vocal tract configuration differences between said spoken utterances;

matching one or more vocal tract shades of the plurality of reference profiles based on said vocal tract configuration difference;

determining at least one formant frequency;

determining at least one anti-formant frequency;

evaluating a difference between the formant frequency and the anti-formant frequency for characterizing one aspect of a natural change in a vocal tract configuration; and determining if the user profile matches one of the plurality of reference profiles for authenticating said user, wherein a user profile includes at least one of a phrase, a biometric voice print, and a device identifier.

2. The method of claim 1, wherein the identifying further comprises:

determining a variability of the one or more spoken utterances for creating said biometric voice print, wherein an acceptable variability of the biometric voice print is determined between at least two or more spoken utterances, wherein the biometric voice print is a vocal tract configuration that is physically unique to a vocal tract of said user wherein the biometric voice print captures physical features associated with characteristic changes of a person's vocal tract that are unique to an individual during the pronunciation of a pass phrase.

3. The method of claim 1, further comprising:

upon authenticating said user, granting access to one or more resources having a communication with the device.

4. The method of claim 1, wherein the step of identifying the biometric voice print further comprises the steps of:

generating a first voice print in response to a speaker's voice;

generating at least a second voice print in response to the speaker's voice;

identifying a difference between the first voice print and the second voice print;

determining whether the difference corresponds to a natural change of the speaker's vocal tract; and authenticating the speaker if the difference is indicative of a natural change in the speaker's vocal tract.

5. The method of claim 1, wherein the device includes a global positioning system (GPS) for identifying the location of the device.

6. The method of claim 1, further comprising:

receiving a second spoken utterance by the user that identifies a location of the user; and acknowledging that the location of the user corresponds to an accepted location.

7. The method of claim 1, wherein the mobile device identifier is an International Mobile Equipment Identity (IMEI) number.

8. The method of claim 7, wherein the IMEI number is associated with the biometric voiceprint in a database that uses the IMEI number for indexing the biometric voice print.

9. The method of claim 1, wherein the mobile device identifier is a PIN assigned to the device.

10. The method of claim 1, wherein the device is one of a mobile handset, a cell phone, a personal digital assistant, a laptop, a notebook, a portable music player, and a communications device.

11. The method of claim 1, wherein a first part of the authentication occurs on the device and a second part of the authentication occurs on the authentication server.

12. The method of claim 1, wherein the authentication server includes software applications such as a web layer, a business layer, and a database access layer.

13. The method of claim 1, wherein the vocal tract configuration differences are evaluated at one or more voiced segments of said spoken utterance.

14. The method of claim 1, wherein a vocal tract configuration difference corresponds to a bounded physical change of a user's vocal tract associated with more than one spoken utterance.

15. The method of claim 1, wherein said vocal tract configuration difference is based on a momentum spectrum that accounts for a dynamic change of a speech spectrum over time.

16. The method of claim 15, wherein said momentum spectrum includes a lower bound and an upper bound for the one or more voice segments of speech, such that variations in the speech spectrum between the lower bound and the upper bound correspond to a unique vocal tract configuration.

17. The method of claim 1, wherein the vocal tract configuration is represented as one or more sections having a corresponding length and area that are characteristic to one or more sections of the user's vocal tract.

18. The method of claim 1, further comprising:

determining whether differences between repeated spoken utterances are within a distortion range; and determining a voice print match if the differences are within the distortion range.

19. The method of claim 1, wherein the evaluating a difference between the formant frequencies and anti-formant frequencies compensates for a telephone bandwidth.

20. The method of claim 1, wherein higher formant frequencies are emphasized to characterize one aspect of a speaker's articulation style.

21. A method for voice authentication, comprising:

receiving a spoken utterance during a call on an Interactive Voice Response (IVR) system from a device;

invoking a programmatic action in response to a recognition of said spoken utterance, analyzing said spoken utterance to identify a voice print of a user submitting said spoken utterance;

verifying a location of the device;

determining a device identifier associated with the device;

granting the user access to said programmatic action based on an authentication of a recognized voice print, a recognized spoken utterance, the device identifier, and the location of the device;

establishing a connection to at least one authentication server;

sending a user profile to said at least one authentication server;

comparing said user profile with a plurality of reference profiles stored on said at least one authentication server;

upon recognizing the phrase, evaluating one or more vocal tract configuration differences between said spoken utterances;

matching one or more vocal tract shades of the plurality of reference profiles based on said vocal tract configuration difference;
determining at least one formant frequency;
determining at least one anti-formant frequency;
evaluating a difference between the formant frequency and the anti-formant frequency for characterizing one aspect of a natural change in a vocal tract configuration; and
determining if the user profile matches one of the plurality of reference profiles for authenticating said user,
wherein a user profile includes at least one of a phrase, a biometric voice print, and a device identifier.

22. The method of claim 21, further comprising:
recognizing one or more numbers in the spoken utterance; and
automatically entering said one or more numbers for accessing a feature of the IVR,
whereby the programmatic action dials the one or more numbers recognized in the spoken utterance for accessing the feature.

23. The method of claim 21, further comprising:
from a device used to submit the spoken utterance, receiving a device identifier; and
validating a registration of the device to the user prior to granting access.

24. The method of claim 21, wherein the programmatic action is a secure transaction and the spoken utterance identifies secure information such as an account number, a bank routing number, a telephone number, a social security number, and a pin number.

25. The method of claim 24, further comprising:
upon said granting access, forwarding the call to a call center in accordance with the programmatic action; and
upon connection with the call center, invoking a screen pop at the call center to display user account information.

26. The method of claim 25, wherein the Interactive Voice Response (IVR) system resides on one of a PBX, a gateway, a voice server, and an internet voice server.

* * * * *

UNITED STATES PATENT AND TRADEMARK OFFICE
CERTIFICATE OF CORRECTION

| | | |
|---|---|---|
| PATENT NO. | : 7,536,304 B2 | |
| APPLICATION NO. | : 11/420190 | |
| DATED | : May 19, 2009 | |
| INVENTOR(S) | : Germano DiMambro and Bernardas Salna | |

It is certified that error appears in the above-identified patent and that said Letters Patent is hereby corrected as shown below:

Title Page;

Please insert reference to priority, below (65) Prior Publication Data, as follows:

--Related U.S. Application Data

(60) Provisional Application No. 60/685,427, filed on May 27, 2005--

Signed and Sealed this
Twenty-fourth Day of April, 2012

David J. Kappos
*Director of the United States Patent and Trademark Office*